(12) United States Patent
Haraden et al.

(10) Patent No.: US 10,672,368 B2
(45) Date of Patent: *Jun. 2, 2020

(54) NO MISS CACHE STRUCTURE FOR REAL-TIME IMAGE TRANSFORMATIONS WITH MULTIPLE LSR PROCESSING ENGINES

(71) Applicant: MICROSOFT TECHNOLOGY LICENSING, LLC, Redmond, WA (US)

(72) Inventors: Ryan Scott Haraden, Duvall, WA (US); Tolga Ozguner, Redmond, WA (US); Adam James Muff, Woodinville, WA (US); Jeffrey Powers Bradford, Woodinville, WA (US); Christopher Jon Johnson, Snoqualmie, WA (US); Gene Leung, Sammamish, WA (US); Miguel Comparan, Kenmore, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,255

(22) Filed: Feb. 14, 2019

(65) Prior Publication Data

US 2019/0189089 A1    Jun. 20, 2019

Related U.S. Application Data

(63) Continuation of application No. 15/485,899, filed on Apr. 12, 2017, now Pat. No. 10,255,891.

(51) Int. Cl.
*G06T 1/60* (2006.01)
*G09G 5/395* (2006.01)
(Continued)

(52) U.S. Cl.
CPC ......... *G09G 5/395* (2013.01); *G02B 27/0172* (2013.01); *G06F 1/163* (2013.01);
(Continued)

(58) Field of Classification Search
None
See application file for complete search history.

(56) References Cited

U.S. PATENT DOCUMENTS

2009/0002379 A1*  1/2009  Baeza ................ G06T 1/20
                                                        345/522
2011/0267482 A1  11/2011  Wetzstein et al.
(Continued)

OTHER PUBLICATIONS

"Non Final Office Action Issued in U.S. Appl. No. 15/470,790", dated Jul. 23, 2019, 22 Pages (MS# 401756-US-NP.
(Continued)

*Primary Examiner* — Nicholas R Wilson
(74) *Attorney, Agent, or Firm* — Workman Nydegger

(57) ABSTRACT

Systems and methods are disclosed herein for providing improved cache structures and methods that are optimally sized to support a predetermined range of late stage adjustments and in which image data is intelligently read out of DRAM and cached in such a way as to eliminate re-fetching of input image data from DRAM and minimize DRAM bandwidth and power. The systems and methods can also be adapted to work with compressed image data and multiple LSR processing engines.

19 Claims, 9 Drawing Sheets

(51) Int. Cl.
    *G09G 5/00*         (2006.01)
    *G02B 27/01*      (2006.01)
    *G06F 3/01*         (2006.01)
    *G06F 1/16*         (2006.01)
    *G06F 12/0875*    (2016.01)
    *G09G 5/36*         (2006.01)
    *G06F 12/0862*    (2016.01)
    *G09G 5/393*      (2006.01)
    *G06T 1/20*         (2006.01)
    *G06F 12/08*      (2016.01)

(52) U.S. Cl.
    CPC ............... *G06F 3/011* (2013.01); *G06F 12/08* (2013.01); *G06F 12/0862* (2013.01); *G06F 12/0875* (2013.01); *G06T 1/20* (2013.01); *G06T 1/60* (2013.01); *G09G 5/006* (2013.01); *G09G 5/363* (2013.01); *G09G 5/393* (2013.01); *G02B 2027/014* (2013.01); *G02B 2027/0174* (2013.01); *G02B 2027/0178* (2013.01); *G06F 2212/1021* (2013.01); *G06F 2212/6026* (2013.01); *G09G 2340/02* (2013.01); *G09G 2350/00* (2013.01); *G09G 2360/121* (2013.01); *Y02D 10/13* (2018.01)

(56) References Cited

U.S. PATENT DOCUMENTS

| | | |
|---|---|---|
| 2012/0139918 A1 | 6/2012 | Michail et al. |
| 2012/0218381 A1 | 8/2012 | Uro et al. |
| 2015/0029218 A1* | 1/2015 | Williams ................ G06F 3/013 345/633 |
| 2017/0003764 A1 | 1/2017 | Li |
| 2017/0308988 A1 | 10/2017 | Li et al. |

OTHER PUBLICATIONS

"Final Office Action Issued in U.S. Appl. No. 15/470,737", dated Apr. 1, 2019, 9 pages (MS# 401547-US-NP).

"Notice of Allowance Issued in U.S. Appl. No. 15/470,790", dated Sep. 25, 2019, 9 Pages.

* cited by examiner

NO MISS CACHE STRUCTURE FOR REAL-TIME IMAGE TRANSFORMATIONS WITH MULTIPLE LSR PROCESSING ENGINES

CROSS-REFERENCE TO RELATED APPLICATIONS

This application is a Continuation of U.S. patent application Ser. No. 15/485,899 filed on Apr. 12, 2017, entitled "No Miss Cache Structure with Real-Time Image Transformations with Multiple LSR Processing Engines," which application is expressly incorporated herein by reference in its entirety.

BACKGROUND

Background and Relevant Art

Mixed reality is a technology that allows virtual imagery to be mixed with a real world physical environment in a display. Systems for mixed reality may include, for example, see through head-mounted display (HMD) devices or smart phones with built in cameras. Such systems typically include processing units which provide the imagery under the control of one or more applications. Full virtual reality environments, in which no real world objects are viewable, can also be supported using HMD and other devices.

Many HMDs also include one or more forward-facing cameras that capture the environment in front of the user as viewed from the user's perspective. Such forward-facing cameras may be depth cameras, which not only capture image data, but also capture depth or surface data about the user's environment. Image data captured from the forward-facing camera may be used by on-board processors located on the HMD to generate mixed reality or virtual reality display data that can be rendered to the user via the user display incorporated into the HMD.

In such systems, the user's body and specifically the head can move in real time in relation to the virtual environment. For example, in a mixed reality application, if the user tilts their head in one direction, they would not expect the image or hologram to tilt with them. Ideally, the system would measure the position of the head and render images at a fast enough rate to eliminate any jitter or drift in the image position as perceived by the user. However, typical graphics processing units (GPU) currently only render frames between 30 to 60 frames per second, depending on the quality and performance of the GPU. This results in a potential delay of 16 to 33 milliseconds between the point in time the head position is detected and when the image is actually output to a display. Additional latency can also be associated with the time it takes to determine the head position and/or delays between the GPU's frame buffer and the final display. The result is a potentially large error between where the user would expect an image and where the image is displayed, leading to user discomfort.

In order to reduce or eliminate such errors, existing systems can apply late stage corrections to make adjustments to the image after it is rendered by the GPU, but before the pixels are displayed, in order to compensate for rotation, translation and/or magnification due to head movement (sometimes hereinafter referred to as "late state adjustments", "late stage reprojection", "LRS" or "LSR adjustments"). Since frames can be rendered at a high rate and with high resolution, existing systems employing LSR can require a large amount of DRAM bandwidth and power. Of course, in the context of a wireless, battery-powered HMD, chip size as well as bandwidth and power requirements can be very important.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Systems and methods are disclosed herein for providing improved cache structures and methods that are optimally sized to support a predetermined range of late stage adjustments and in which image data is intelligently read out of DRAM and cached in such a way as to eliminate re-fetching of input image data from DRAM and minimize DRAM bandwidth and power.

In one embodiment, the cache structure is optimally sized to support a predetermined range of late stage adjustments and is managed such that: the cache/buffer can fetch each line of input image data only once to reduce input bandwidth; the cache can hold multiple lines sufficient to construct the output image (but still much less than the full image); the cache can pre-fetch data before it is needed so that it does not add any additional latency to the image processing pipeline; and the cache can evict input image data only when it is no longer needed to construct the output image, but can automatically evict input image data when it is no longer needed.

In another aspect, input image data can initially be written into the cache in the order it will be needed to begin rendering the output image.

In yet another aspect, the input image data can be written into the cache and organized in a manner that makes predictable the order in which the output image data is read out of the cache.

In yet another embodiment, the cache structure and methods can be adapted for use with compressed image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
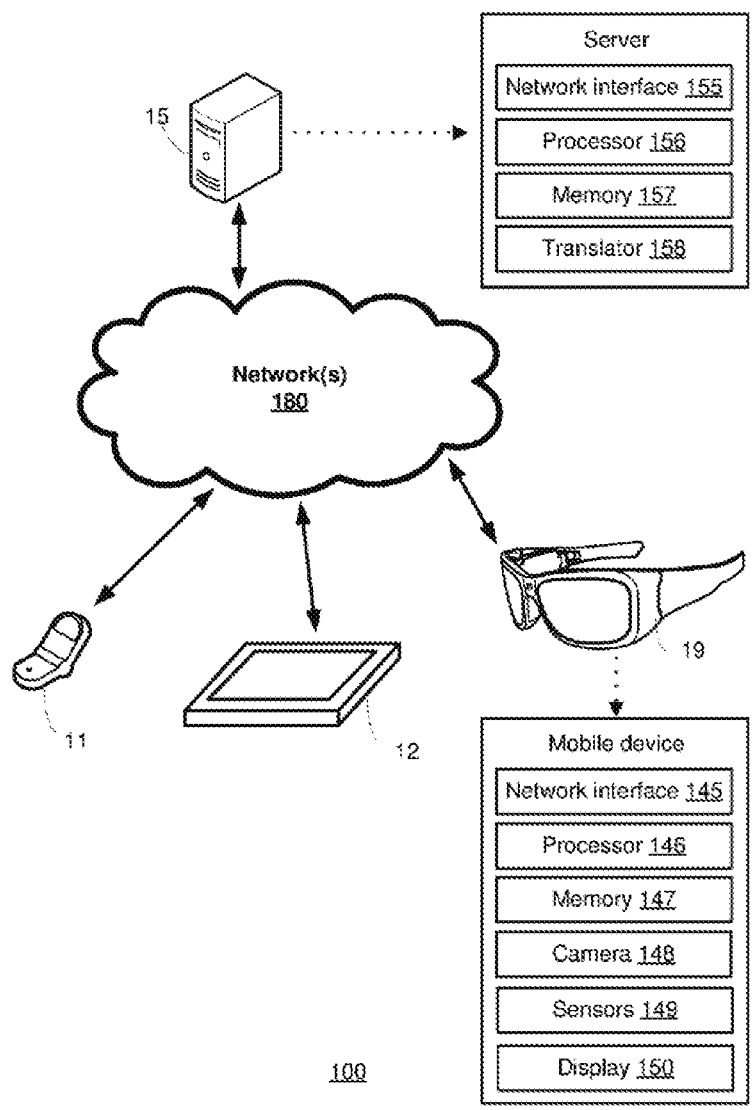
FIG. 1 is a functional block diagram of one illustrative example of an operating environment for implementing the systems and methods disclosed herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As used herein: the terms "input image data" or "GPU image data" may be used interchangeably to refer to image data generated by the GPU of the HMD; and the terms "output image data" or "display image data" may be used interchangeably to refer to data output by the improved cache disclosed herein to render an LSR-adjusted display image.

Subheadings included in the following description are provided for the convenience of the reader, to assist the reader in navigating this disclosure, and are not intended to be limiting or to be used in construing the nature or scope of either this disclosure or the appended claims.

The technology described below is directed to improved cache structures and methods that are designed to be optimally sized to support a predetermined range of late stage adjustments and in which image data is intelligently read out of DRAM and cached in such a way as to eliminate re-fetching of input image data from DRAM and minimize DRAM bandwidth and power. The cache structure is optimally sized to support a predetermined range of late stage adjustments and is managed such that: the cache/buffer can fetch each line of input image data only once to reduce input bandwidth; the cache can hold multiple lines sufficient to construct the output image (but still much less than the full image); the cache can pre-fetch data before it is needed so that it does not add any additional latency to the image processing pipeline; and the cache can evict input image data only when it is no longer needed to construct the output image, but can automatically evict input image data when it is no longer needed. Input image data can initially be written into the cache in the order it will be needed to begin rendering the output image, and the input image data can be written into the cache and organized in a manner that makes predictable the order in which the output image data is read out of the cache.

The technology includes both methods and systems for providing an improved cache structure intended for use in the context of a head-mounted, augmented, mixed or virtual reality display system (HMD) having a graphics processing unit (GPU), a holographic processing unit (HPU) with an on-chip cache, system memory, and a display, the GPU generating image that can include text, holographic objects and other visual elements that can be displayed on the display, the system memory for storing GPU images, and the HPU configured to perform late stage adjustments to correct GPU images for movement of the HMD that may occur during the image rendering process, and the cache for constructing an output image based on the GPU generated image and the late stage adjustments, and the HPU generating a late stage adjustment matrix that maps each pixel of the late stage adjusted output image to the corresponding pixel of the GPU image. The technology can also be adapted to work with compressed image data.

In one embodiment, the method can include: pre-fetching and decompressing of one or more tiles of compressed GPU image data from system memory and placing the decompressed GPU image data in a first cache, the one or more tiles being selected in the order needed to construct the output image; pre-fetching one or more rows of decompressed image data from the first cache, the one or more tiles rows being selected in the order needed to construct the output image; writing the pre-fetched one or more rows of decompressed GPU image data into a second cache in the order needed to construct the output image based on the late stage adjustment matrix; and constructing the output image by walking the one or more rows of the GPU image in the second cache according to the adjustment matrix and outputting the output image. Additional methods can also include: the selecting of the sizes of the first cache and the second cache to support a predetermined range of late stage adjustments; in pre-fetching one or more rows of decompressed image data being a sufficient number of rows so that all of the rows needed to construct a first portion of the output image are present in the second cache; in pre-fetching one or more rows of decompressed image data, the first row needed to construct the output image being placed in at or near the middle of the second cache and each of the other rows of the one or more rows being placed in the second cache above or below the first row based on their relative positions in the GPU image; rendering the output image on the display; performing an additional pre-fetch operations, as needed, to retrieve one or more additional tiles of compressed GPU image data from system memory, the one or more additional tiles being selected and being written into the first cache in the order needed to construct the output image based on the late stage adjustment matrix; automatically evicting each row of uncompressed GPU image data from the second cache when it is no longer needed to construct the output image; overwriting one or more rows of uncompressed GPU image data already in the second cache with one or more additional rows of uncompressed GPU image data retrieved during a subsequent pre-fetch operation from the first cache; and refetching decompressed image data from the first cache one or more times, as needed, to construct the output image.

In another embodiment, the method can include: pre-fetching one or more tiles of compressed GPU image data from system memory and placing the compressed GPU image data in a first cache, the one or more tiles of compressed GPU image data being selected in the order needed to construct the output image; pre-fetching and decompressing one or more tiles of compressed GPU image data from the first cache and placing the decompressed GPU image data in a second cache, the one or more tiles being selected in the order needed to construct the output image; pre-fetching one or more rows of decompressed GPU image data from the second cache and writing the pre-fetched one or more rows of decompressed GPU image data into a third cache in the order needed to construct the output image based on the late stage adjustment matrix; and constructing the output image by walking the one or more rows of the decompressed GPU image data in the third cache according to the adjustment matrix and outputting the output image. Additional methods can also include: selecting the sizes of the first cache, the second cache and the third cache to support a predetermined range of late stage adjustments; in pre-fetching one or more tiles of decompressed image data being a sufficient number of tiles so that all of the tiles needed to construct a first portion of the output image are present in the second cache; in pre-fetching one or more rows of decompressed image data, the first row needed to construct the output image being placed in at or near the middle of the third cache and each of the other rows of the one or more rows being placed in the third cache above or below the first row based on their relative positions in the GPU image; rendering the output image on the display; performing additional pre-fetch operations, as needed, to retrieve one or more additional tiles of compressed GPU image data from system memory, the one or more additional tiles of compressed GPU image data in the system memory being selected and being written into the first cache in the order needed to construct the output image based on the late stage adjustment matrix; performing additional pre-fetch operations, as needed, to retrieve and decompress one or more additional tiles of compressed GPU image data from the first cache to the second cache, the one or more additional tiles of compressed GPU image data in the first cache being selected and being written into the second cache in the order needed to construct the output image based on the late stage adjustment matrix; performing additional pre-fetch operations, as needed, to retrieve one or more additional lines of decompressed GPU image data from the second cache to the third cache, the one or more additional tiles of compressed GPU image data in the second cache being selected and being written into the third cache in the order needed to construct the output image based on the late stage adjustment matrix; automatically evicting each row of uncompressed GPU image data from the third cache when it is no longer needed to construct the output image; overwriting one or more rows of uncompressed GPU image data already in the third cache with one or more additional rows of uncompressed GPU image data retrieved during a subsequent pre-fetch operation from the second cache; and refetching the one or more rows of decompressed image data can be refetched from the second cache one or more times, as needed, to construct the output image.

The technology is also directed to systems to implement one or more of the methods described herein. More specifically, such systems can include one or more processors and one or more computer-readable media having stored thereon instructions that are executable by the one or more processors to configure a computer system to implement one or more of the methods disclosed herein.

Exemplary Operating Environment

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display. Display 150 may comprise an LED or OLED display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a HMD that provides an augmented, mixed or virtual reality environment or a mixed reality environment to an end user of the HMD. In the context of an augmented or mixed reality environment, the HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, an HMD, such as mobile device 19, may use images of an environment captured from an outward facing camera in order to determine a six degree of freedom (6DOF) pose corresponding with the images relative to a 3D model of the environment. The 6DOF pose may comprise information associated with the position and orientation of the HMD within the environment. The 6DOF pose may be used for localizing the HMD and for generating images of virtual objects such that the virtual objects appear to exist at appropriate locations within the environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

In some embodiments, an HMD, such as mobile device 19, may display images of virtual objects within an augmented reality (AR) environment at a frame rate that is greater than a rendering frame rate for the core rendering pipeline or rendering graphics processing unit (GPU). The HMD may modify pre-rendered images or forward predicted images that are rendered at the rendering frame rate based on updated pose estimates that are provided at a higher frequency than the rendering frame rate. In some embodiments, the HMD may generate the pre-rendered image based on a predicted pose at the rendering frame rate (e.g., every 16 ms), determine one or more updated poses associated with the HMD subsequent to generating the pre-rendered image (e.g., every 2 ms), generate one or more updated images based on the one or more updated poses and the pre-rendered image, and display the one or more updated images on the HMD. In some cases, the one or more updated images may be generated via homographic transformations and/or a pixel offset adjustments using circuitry within the display, such as display 150.

Figure 2:
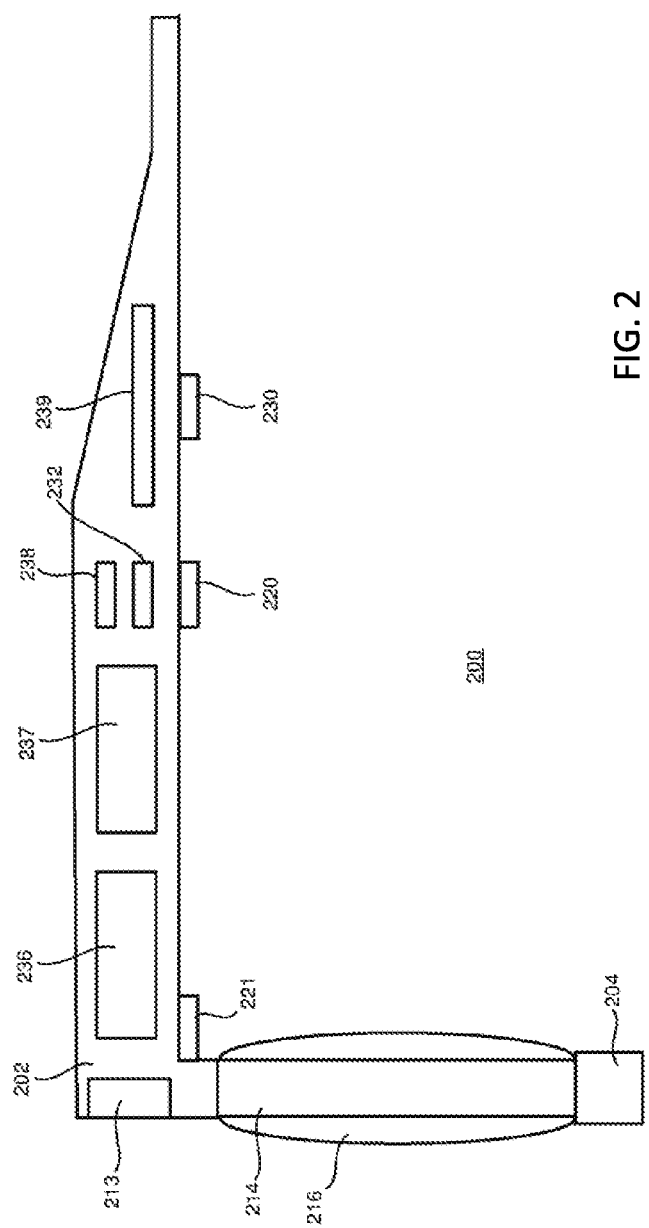
FIG. 2 is a schematic representation of one illustrative example of an HMD.

FIG. 2 depicts one embodiment of a portion of an HMD 200, such as mobile device 19 in FIG. 1. Only the right side of HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The see-through display may display images of virtual objects by modulating light provided to the display, such as a liquid crystal on silicon (LCOS) display, or by generating light within the display, such as an OLED display. The capture device 213 may be calibrated such that a field of view (FOV) captured by the capture device 213 corresponds with the FOV as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the FOV captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a FOV. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 3:
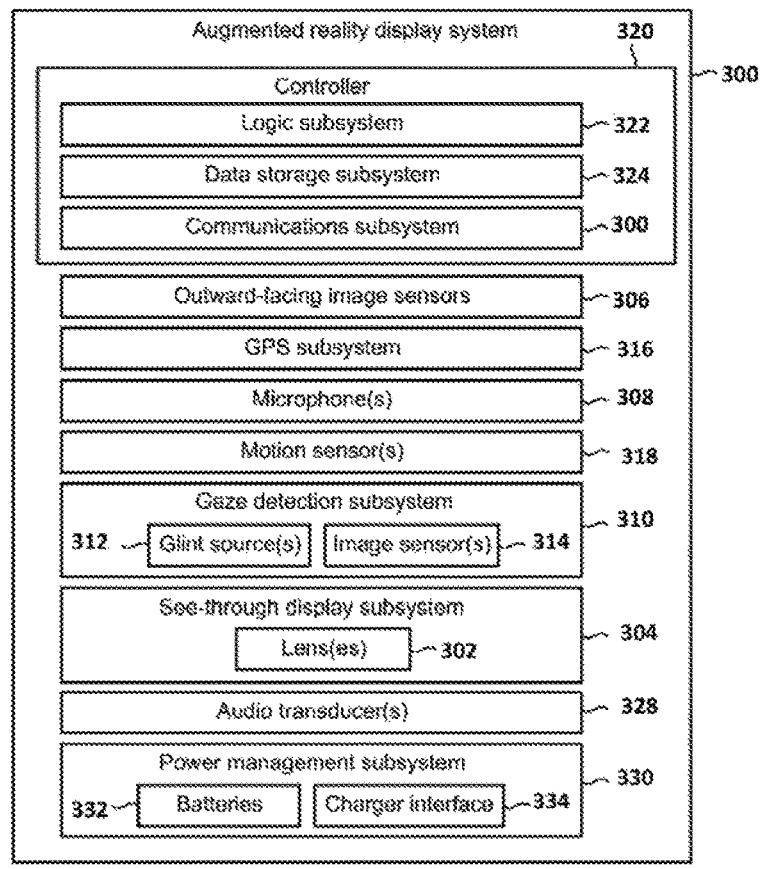
FIG. 3 is a functional block diagram of one illustrative example of an HMD.

FIG. 3 shows a functional block diagram of one example of a mixed reality display system 300. Display system 300 can include one or more lenses 302 that form a part of a see-through display subsystem 304, such that images may be displayed using lenses 302 (e.g., using projection onto lenses 302, one or more waveguide systems incorporated into the lenses 302, and/or in any other suitable manner). Display system 300 can also include one or more outward-facing image sensors 306 configured to acquire images of a background scene and/or physical environment being viewed by a user, and may include one or more microphones 308 configured to detect sounds, such as voice commands from a user. Outward-facing image sensors 306 may include one or more depth sensors and/or one or more two-dimensional image sensors. In alternative arrangements, instead of incorporating a see-through display subsystem, display system 300 may display mixed reality images through a viewfinder mode for an outward-facing image sensor.

The display system 300 may further include a gaze detection subsystem 310 configured for detecting a direction of gaze of each eye of a user or a direction or location of focus, as described above. Gaze detection subsystem 310 may be configured to determine gaze directions of each of a user's eyes in any suitable manner. For example, in the illustrative example shown, a gaze detection subsystem 310 includes one or more glint sources 312, such as infrared light sources, that are configured to cause a glint of light to reflect from each eyeball of a user, and one or more image sensors 314, such as inward-facing sensors, that are configured to capture an image of each eyeball of the user. Changes in the glints from the user's eyeballs and/or a location of a user's pupil, as determined from image data gathered using the image sensor(s) 314, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 310 may have any suitable number and arrangement of light sources and image sensors. In some implementations, the gaze detection subsystem 1110 may be omitted.

The display system 300 may also include additional sensors. For example, display system 300 may comprise a global positioning system (GPS) subsystem 316 to allow a location of the display system 300 to be determined. This may help to identify real world objects, such as buildings, etc., that may be located in the user's adjoining physical environment.

The display system 300 may further include one or more motion sensors 318 (e.g., inertial, multi-axis gyroscopic or acceleration sensors) to detect movement and position/orientation/pose of a user's head when the user is wearing the system as part of a mixed-reality HMD device. Motion data may be used, potentially along with eye-tracking glint data and outward-facing image data, for gaze detection, as well as for image stabilization to help correct for blur in images from the outward-facing image sensor(s) 306. The use of motion data may allow changes in gaze location to be tracked even if image data from outward-facing image sensor(s) 306 cannot be resolved.

In addition, motion sensors 318, as well as microphone(s) 308 and gaze detection subsystem 310, also may be employed as user input devices, such that a user may interact with the display system 300 via gestures of the eye, neck and/or head, as well as via verbal commands in some cases. It should be understood that sensors illustrated in FIGS. 3 and 4 and described in the accompanying text are included for the purpose of example and are not intended to be limiting in any manner, as any other suitable sensors and/or combination of sensors may be utilized to meet the needs of a particular implementation of a mixed-reality reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 300 can further include a controller 320 having a logic subsystem 322 and a data storage subsystem 324 in communication with the sensors, gaze detection subsystem 310, display subsystem 304, and/or other components through a communications subsystem 326. The communications subsystem 326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 324 may include instructions stored thereon that are executable by logic subsystem 322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 300 is configured with one or more audio transducers 328 (e.g., speakers, earphones, etc.) so that audio can be utilized as part of a mixed-reality experience. A power management subsystem 330 may include one or more batteries 332 and/or protection circuit modules (PCMs) and an associated charger interface 334 and/or remote power interface for supplying power to components in the display system 300.

It may be appreciated that display devices 19, 200 and 300 are described for the purpose of example, and thus are not meant to be limiting. It is to be further understood that the display device may include additional and/or alternative sensors, cameras, microphones, input devices, output devices, etc., than those shown without departing from the scope of the present arrangement. Additionally, the physical configuration of a display device and its various sensors and subcomponents may take a variety of different forms without departing from the scope of the present arrangement.

Microsoft HoloLens

One example of a HMD is the Microsoft HoloLens, which is a pair of mixed reality head-mounted smartglasses. HoloLens has see-through holographic lenses that use an advanced optical projection system to generate multi-dimensional full-color holograms with very low latency so a user can see holographic objects in a real world setting.

Located at the front of the HoloLens are sensors and related hardware, including cameras and processors. The HoloLens also incorporates an inertial measurement unit (IMU), which includes an accelerometer, gyroscope, and a magnetometer, four "environment understanding" sensors, an energy-efficient depth camera with a 120°×120° angle of view, a forward-facing 2.4-megapixel photographic video camera, a four-microphone array, and an ambient light sensor. HoloLens contains advanced sensors to capture information about what the user is doing and the environment the user is in. The built in cameras also enable a user to record (mixed reality capture (MRC)) HD pictures and video of the holograms in the surrounding world to share with others.

Enclosed within the visor is a pair of transparent combiner lenses, in which the projected images are displayed in the lower half. The HoloLens must be calibrated to the interpupillary distance (IPD), or accustomed vision of the user.

Along the bottom edges of the side, located near the user's ears, are a pair of small, 3D audio speakers. The speakers do not obstruct external sounds, allowing the user to hear virtual sounds, along with the environment. Using head-related transfer functions, the HoloLens generates binaural audio, which can simulate spatial effects; meaning the user, virtually, can perceive and locate a sound, as though it is coming from a virtual pinpoint or location.

On the top edge are two pairs of buttons: display brightness buttons above the left ear, and volume buttons above the right ear. Adjacent buttons are shaped differently—one concave, one convex—so that the user can distinguish them by touch.

At the end of the left arm is a power button and row of five, small individual LED nodes, used to indicate system status, as well as for power management, indicating battery level and setting power/standby mode. A USB 2.0 micro-B receptacle is located along the bottom edge. A 3.5 mm audio jack is located along the bottom edge of the right arm.

In addition to a central processing unit (CPU) and GPU, HoloLens features a custom-made Microsoft Holographic Processing Unit (HPU), a coprocessor manufactured specifically for the HoloLens. The main purpose of the HPU is processing and integrating data from the sensors, as well as handling tasks such as spatial mapping, gesture recognition, and voice and speech recognition. The HPU processes terabytes of information from the HoloLens's sensors from real-time data.

The lenses of the HoloLens use optical waveguides to color blue, green, and red across three different layers, each with diffractive features. A light engine above each combiner lens projects light into the lens, a wavelength which then hits a diffractive element and is reflected repeatedly along a waveguide until it is output to the eye. Similar to that of many other optical head-mounted displays, the display projection for the HoloLens occupies a limited portion of the user's FOV, particularly in comparison to virtual reality head-mounted displays, which typically cover a much greater FOV.

The HoloLens contains an internal rechargeable battery, but can be operated while charging. HoloLens also features IEEE 802.11ac Wi-Fi and Bluetooth 4.1 Low Energy (LE) wireless connectivity.

With HoloLens a user can create and shape holograms with gestures, communicate with apps using voice commands, and navigate with a glance, hand gestures, Controllers and/or other pointing devices. HoloLens understands gestures, gaze, and voice, enabling the user to interact in the most natural way possible. With spatial sound, HoloLens synthesizes sound so the user can hear holograms from anywhere in the room, even if they are behind the user.

Additional details regarding various embodiments of Hololens can be found in U.S. Provisional Patent Application Ser. No. 62/029,351, filed Jul. 25, 2014 and entitled "Head Mounted Display Experiences", U.S. patent application Ser. No. 14/600,774, filed Jan. 20, 2015 and entitled "Anti-Trip when Immersed in a Virtual Reality Environment", U.S. patent application Ser. No. 14/611,447, filed Feb. 2, 2015 and entitled "Ground Plane Adjustment in a Virtual Reality Environment", U.S. patent application Ser. No. 14/612,850, filed Feb. 3, 2015 and entitled "Smart Placement of Virtual Objects to Stay in the Field of View of a Head Mounted Display", U.S. patent application Ser. No. 14/688,695, filed Apr. 16, 2015 and entitled "Virtual Reality Environment with Real World Objects", U.S. patent application Ser. No. 14/688,817, filed Apr. 16, 2015 and entitled "Three-Dimensional Mixed-Reality Viewport", U.S. patent application Ser. No. 14/697,109, filed Apr. 27, 2015 and entitled "Gaze-Based Object Placement within a Virtual Reality Environment", U.S. patent application Ser. No. 14/697,227, filed Apr. 27, 2015 and entitled "Use of Surface Reconstruction Data to Identify Real World Floor", U.S. patent application Ser. No. 14/722,942, filed May 27, 2015 and entitled "Smart Transparency For Holographic Objects", and U.S. patent application Ser. No. 14/723,065, filed May 27, 2015 and entitled "Multi-User Gaze Projection Using Head Mounted Display Devices", the disclosures of which are incorporated herein by reference.

Late State Reprojection

One issue with generating a realistic augmented, mixed or virtual reality environment relates to the latency or amount of time in which images of world-locked virtual objects corresponding with a particular pose of an HMD are displayed to an end user of the HMD. For example, if too much time lapses between the time the end user's head turns away from the particular pose and the time an image of a virtual object is displayed based on the particular pose, then the virtual object will appear to drift away from its intended location within the augmented reality environment (i.e., the image may not appear to be aligned with an intended real-world location or object). Consequently, HMDs, including Hololens, can also include technology for generating and displaying images associated with one or more virtual objects within an augmented reality (AR) environment at a frame rate that is greater than a rendering frame rate and for improving virtual object stability. The displayed images may include late stage graphical adjustments of pre-rendered scenes (i.e., forward predicted scenes that are rendered at a rendering frame rate) in order to incorporate higher frequency pose estimates. The rendering frame rate may correspond with the minimum time to render images associated with a pose of a head-mounted display device (HMD). The HMD may determine a predicted pose associated with a future position and orientation of the HMD (e.g., a predicted pose of the HMD 10 ms or 20 ms in the future), generate a pre-rendered image based on the predicted pose, determine an updated pose associated with the HMD subsequent to generating the pre-rendered image or concurrent with the pre-rendered image being generated, generate an updated image based on the updated pose and the pre-rendered image, and display the updated image on the HMD. The updated image may be generated via a homographic transformation and/or a pixel offset adjustment of the pre-rendered image. In some cases, the updated image may be generated by circuitry within the display.

The predicted pose may be determined based on a current position and orientation of the HMD and an acceleration and a velocity of the HMD immediately prior to determining the predicted pose (e.g., by extrapolating the predicted pose based on movement of the HMD 5 ms or 10 ms prior to determining the predicted pose). The updated pose may be determined based on updated pose information that is provided to a pose tracker at a higher frequency than the rendering frame rate. The updated pose information may be generated using a low-latency inertial measurement unit (IMU) or combination of IMU and camera-based pose tracking. The updated image may comprise an image rotation, translation, resizing (e.g., stretching or shrinking), shifting, or tilting of at least a portion of the pre-rendered image in order to correct for differences between the predicted pose and the updated pose (e.g., to compensate for an incorrect pose prediction when generating the pre-rendered image). The updated image may be generated via a homographic transformation of the pre-rendered image. In some cases, the homographic transformation may comprise an affine transformation. The updated image may be generated using a pixel offset adjustment or a combination of homographic transformations and pixel offset adjustments. In some cases, the homographic transformations and/or pixel offset adjustments may be generated downstream from the core rendering pipeline (e.g., using a controller or processor integrated with the display). In other cases, the pixel offset adjustments may be performed using a display that incorporates shift registers or other circuitry for allowing the shifting of pixel values within a pixel array of the display (e.g., similar to the operation of a charge-coupled device).

The updated images comprising late stage graphical adjustments of forward predicted rendered images may be generated using various image reprojection techniques of varying computational complexity. The image reprojection techniques may include per pixel reprojection (e.g., where each pixel of a rendered image is reprojected based on an updated pose), multi-plane homography (e.g., where multiple rendered images associated with multiple planes within a 3D scene are used to generate the composite updated image), single plane homography (e.g., where a single rendered image associated with a single plane within a 3D scene is used to generate the updated image), affine homography, and pixel offset based adjustments. The 2D plane (or a set of one or more 2D planes) within a 3D scene may be determined based on which virtual objects the end user of an HMD has been focusing on within a particular period of time. In addition, eye tracking may be used to determine the most frequently viewed virtual objects within the particular period of time (e.g., within the previous 50 ms or 500 ms). In the case of a single plane, the single plane may be selected based on a depth of the most frequently viewed virtual object within the particular period of time (i.e., the single plane may be set based on the location of the most frequently viewed virtual object within the augmented reality environment). In the case of multiple planes, virtual objects within an augmented reality environment may be segmented into a plurality of groups based on proximity to the multiple planes; for example, a first virtual object may be mapped to a near plane if the near plane is the closest plane to the first virtual object and a second virtual object may be mapped to a far plane if the far plane is the closest plane to the second virtual object. A first rendered image may then be generated including the first virtual object based on the near plane and a second rendered image may be generated including the second virtual object based on the far plane.

In addition, different graphical adjustments may be performed on different portions of a pre-rendered image in order to incorporate higher frequency pose estimates. For example, a first homographic transformation associated with a first pose of an HMD at a first point in time may be applied to a first portion of the pre-rendered image (e.g., a top portion of the pre-rendered image) and a second homographic transformation associated with a second pose of the HMD at a second point in time subsequent to the first point in time may be applied to a second portion of the pre-rendered image different from the first portion (e.g., a bottom portion of the pre-rendered image). In the case of a scanning display or a progressive scanning display, the first homographic transformation may be applied to pixels associated with a first set of scan lines and the second homographic transformation may be applied to pixels associated with a second set of scan lines different from the first set of scan lines. The first homographic transformation may be applied to a single first scan line and the second homographic transformation may be applied to a single second scan line (i.e., homographic transformations may be applied on a per scan line basis).

Additional details regarding LSR can be found in U.S. Pat. No. 9,514,571, issued Nov. 16, 2016 and entitled "Late Stage Reprojection", and U.S. patent application Ser. No. 15/227,453, filed Aug. 3, 2016 and entitled "Late Stage Reprojection," the disclosures of which are incorporated herein by reference.

In prior systems, the LSR adjustment was supported by a relatively small, rolling buffer. As a result, at any given time in the LSR adjustment process, only that portion of the image data that happened to be in the buffer at a particular point in time was available to perform an LSR adjustment, which could significantly limit the range of LSR adjustments that were feasible. In addition, due to memory size and power consumption constraints, prior solutions only supported color-separated displays.

Improved Cache Methods and System

In general, the amount of memory needed to transform a frame of input image data (generated by the GPU and saved in system (DRAM) memory) to output image data properly formatted in raster order for rendering on the output display is generally a function of the complexity of the LSR adjustment, the frame rate the device is sending rendered images, and the speed of the output display rendering pipeline. By also considering the amount of movement (i.e., translation and/or rotation) that an average human's head can travel during a given interval of time, it is possible to compute a predetermined maximum LSR adjustment that a given display system can be designed to support. Then, based on those constraints, components of the output display rendering pipeline can be optimized in order to reduce chip size as well as bandwidth and power consumption requirements. The technology disclosed and claimed herein is particularly directed to providing improved cache structures and methods for doing just that. The following illustrative examples will focus primarily on LSR adjustments arising from rotation/tilting of the head/HMD by the user, but those skilled in the art will readily appreciate that this technology can be adapted to take into account any combination of any one or more types of head movement, including rotation, translation and/or magnification, to compute a predetermined maximum LSR adjustment that a given display system can be designed to support.

For size and power requirements, the cache should be as small as reasonably possible, while still being large enough to accommodate a sufficient number of lines of input image data to allow for efficient and timely processing of the image data. The cache can be appropriately sized so that each rendered line of input image data is only fetched once, thereby reducing the bandwidth and power consumption of the DRAM, and each line of the input image data can be retained in the cache until it is no longer needed. The cache can pre-fetch data before it is needed (zero latency). The cache should also be large enough so that each pre-fetch cycle retrieves a sufficient number of lines of input image data so that, based on the predetermined maximum LSR adjustment, all of the lines of input image data needed to perform the LSR adjustment are present in the cache. And the cache can evict data automatically when it is no longer needed.

With this cache structure and methods, there is no need to wait for the GPU to finish saving the complete image frame to DRAM. Rather, the initial pre-fetch cycle can begin as soon as a sufficient number of lines of input image data necessary to support the predetermined maximum LSR adjustment have been written to DRAM. The time between successive pre-fetch cycles can also be optimized based on the size of the cache, the amount of input image data retrieved in each pre-fetch cycle, and the overall speed of the output display image rendering pipeline. The lines of the input image data can also be pre-fetched in the order in which they will be needed to construct the display image, as determined by the LSR module.

The input image data is also read into and positioned within the cache in a certain order. In general, the input image data can be written into the cache in the order in which it will be needed, as determined by the LSR module, to construct the output display image. This relative positioning of the input image data within the cache also provides a predictable and orderly walk of the data to render the output display image.

The foregoing concepts will now be further explained in the context of the following examples. It should be understood that the following examples are simplified and are provided for purposes of illustrating the foregoing concepts and are not intended to limit the scope of the accompanying claims.

Figure 4:
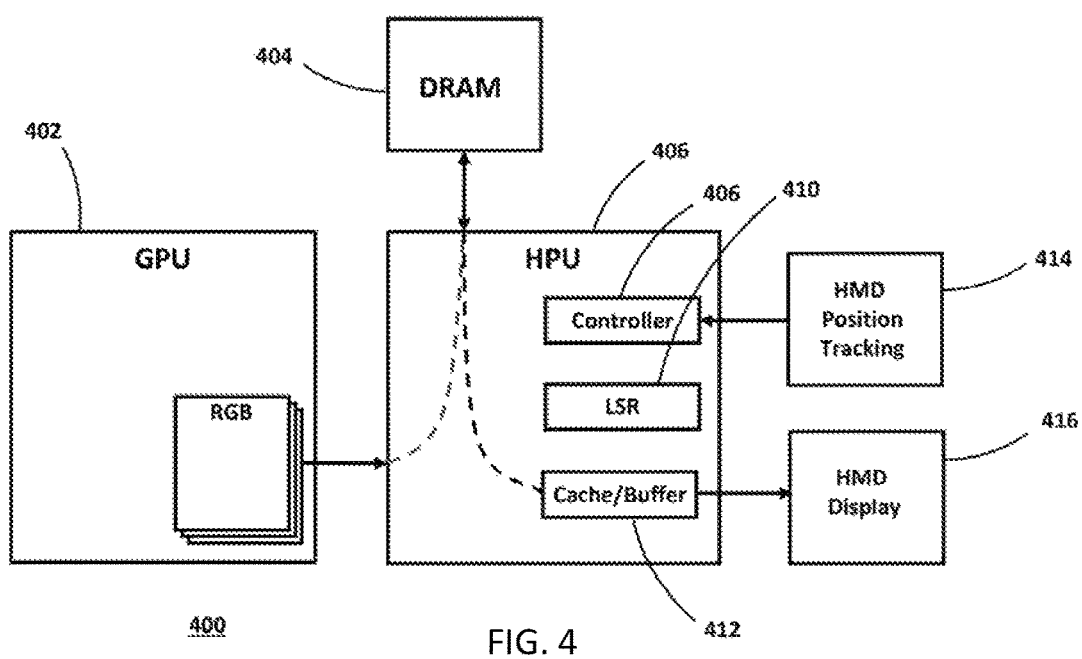
FIG. 4 is a functional block diagram of certain relevant portions of one illustrative example of an image rendering subsystem of an HMD.

Reference is next made to FIG. 4, which illustrates a functional block diagram of certain relevant portions of an image rendering subsystem of an HMD. System 400 can include a graphics processing unit (GPU) 402, system memory (DRAM) 404 and a holographic processing unit (HPU) 406. HPU 406 can include a controller 408, a LSR subsystem 410 and a cache/buffer 412. The HMD can also be equipped with a position tracking subsystem 414, capable of tracking the position of the HMD with six degrees of freedom, and a display 416, such as a see-through augmented reality display of an HMD.

GPU 402 generates image frames for output to the display. As discussed above, these images can include text, holographic objects and other visual elements that can be projected onto display 416 and which can be perceived as being superimposed onto the real world environment when viewed by the user through the HMD display 416. With current technology, GPU can render the frame images and save them to DRAM 404 at approximately 30 to 60 frames per second. As schematically illustrated, the image data can be color-separated with separate red, green and blue frames. The amount of memory allocated to input image data can vary and depends on the resolution of the image frames, but is typically sufficient to hold two image frames before overwriting a previously saved image frame. Thus, at 60 frames per second, a particular image frame may only reside in DRAM 404 for approximately 33 milliseconds before being overwritten. If the HMD remains perfectly still (e.g., no translation and/or rotation, so that no LSR adjustments were necessary), then the image data generated by the GPU (sometimes hereinafter referred to as the "GPU image" or the "input image data") could be read out of DRAM, via cache/buffer 412, and rendered on display 416 without any image transformations or adjustments.

Each time the GPU 402 begins rendering a particular GPU image frame, that image frame is based on a first prediction of the pose the HMD is expected to be in at the time the GPU generated image frame is actually projected on to the HMD display 416. However, the rendering process takes time and sending it to the display takes time, which introduces a certain amount of latency in the image processing pipeline. Based on current technology, this latency can be on the order of approximately 60 milliseconds. And, as discussed above, due to the latency involved in the display image rendering pipeline, it is not uncommon for the HMD to move to a pose that is different from the first predicted pose. In that case, the LSR subsystem 410 uses the first predicted pose and an update pose prediction and performs all of the calculations necessary to reproject the GPU image so that it is corrected to conform to the new perspective the updated pose prediction. Simply stated, the LSR subsystem can use matrix transformations, such as homographic transformations, to create an adjustment matrix that maps, on a pixel-by-pixel basis (and for each color-separated frame), the location of each pixel of the adjusted, output or display image to the location of the corresponding pixel of the original GPU or input image. And the cache structure and methods disclosed herein are designed to read the original GPU input image data out of DRAM 404 and write it out in raster scan order for rendering on the HMD display 416 in a particularly efficient way.

Figure 5:
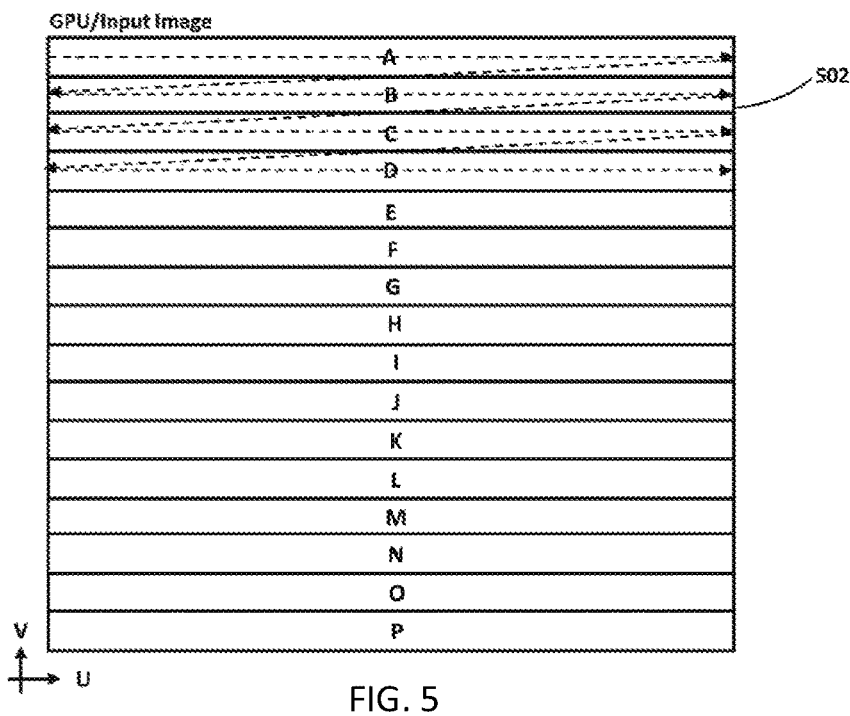
FIG. 5 is a schematic representation of a GPU image frame.
Figure 6:
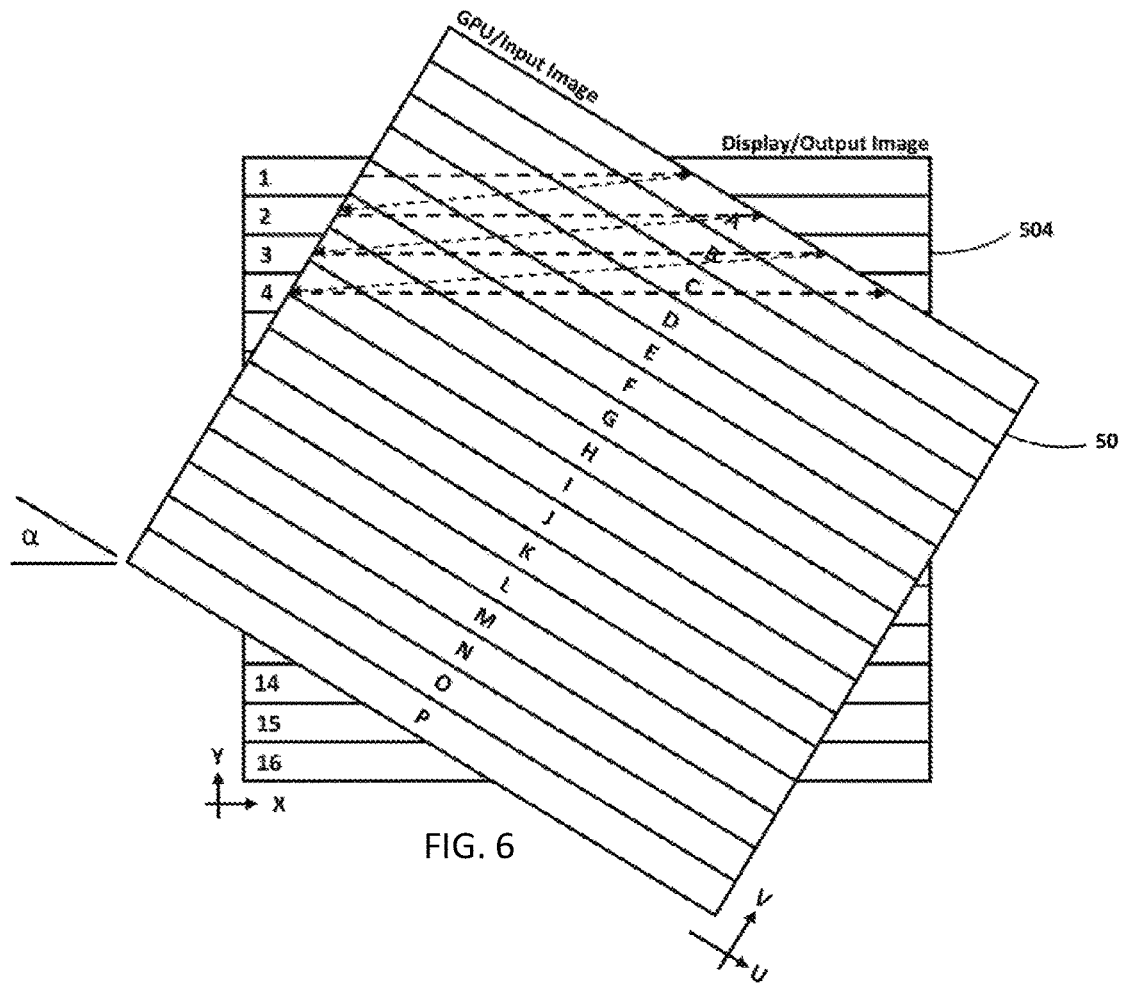
FIG. 6 is a schematic representation of the GPU image frame of FIG. 5 superimposed on a schematic representation of an LSR adjusted output image frame.

Referring to FIGS. 5 and 6. FIG. 5 schematically illustrates an image frame produced by GPU 402. In this example, GPU image 502 is illustrated to include sixteen lines of image data, which are schematically illustrated as rows A through P, and each line of image data can include a number of pixels. The specific number of lines and pixels making up a particular image frame will depend on the aspect ratio and resolution of the image. For the following discussion, the pixels of GPU image 502 are illustrated in a u-v coordinate frame of reference, with the u coordinate corresponding to the horizontal position of a particular pixel or column of pixels within the image frame, and the v coordinate corresponding to the vertical position of a particular pixel or row of pixels within the image frame. GPU image 502 can be rendered by the GPU 402 line-by-line as schematically illustrated by the dashed lines in FIG. 5. Likewise, if no LSR adjustment were needed, the GPU image data 502 could simply be read out of DRAM 404, via cache/buffer 412, and rendered on display 416, since the raster order of the data needed to render the image on display 416 would directly correspond to the order of the GPU image data 502.

FIG. 6, on the other hand, schematically illustrates a case in which, after the time GPU 402 begins rendering GPU image 502, the position tracking subsystem 414 detects that the predicted pose associated with the GPU image 502 has changed and, therefore, an LSR adjustment is needed. FIG. 6 schematically illustrates the GPU image 502 and a corrected output image 504 in an illustrative example where position tracking subsystem detects that an updated predict pose HMD is rotated by an angle α in a clockwise direction from the original predicted pose. For example, when a user of an HMD tilts their head to the right by an angle α, the user would not expect holographic objects within their field of vision to rotate along with the rotation of their head, but would expect the holographic objects to retain their location and orientation relative to the real world environment. Therefore, the GPU image 502 must be corrected to account for these differences to construct a corrected output image that corresponds to the position of the updated predicted pose.

In FIG. 6, GPU image 502 is superimposed over a schematic representation of an output image 504. For the following discussion, the pixels of output image 504 are illustrated in an x-y coordinate frame of reference, with the x coordinate corresponding to the horizontal position of a particular pixel or column of pixels within the image frame, and the y coordinate corresponding to the vertical position of a particular pixel or row of pixels within the output image frame. Once again, LSR subsystem 410 performs all of the calculations necessary to construct the appropriate display or output image 504 and generates an adjustment matrix that maps each pixel of output image 504 to the appropriate and corresponding pixel of GPU image 502.

In the illustrated example, it can be seen that to render display image 504, the first pixels needed would actually come from the fifth row (row E) of input image 502. Then, as processing continues (as schematically represented by the dotted arrows in FIG. 6) to complete the first row of display image 504, pixels would then be needed from the fourth row (row D) of input image 502, then from the third row (row C), then from the second row (row B), and finally from the first row (row A). The ways in which the input image data 502 is retrieved from DRAM 404 and written into cache/buffer 412, according to the cache structure and methods disclosed herein, are designed in such a way to avoid or at least minimize adding any additional latency to the output image rendering pipeline.

Figure 7B:
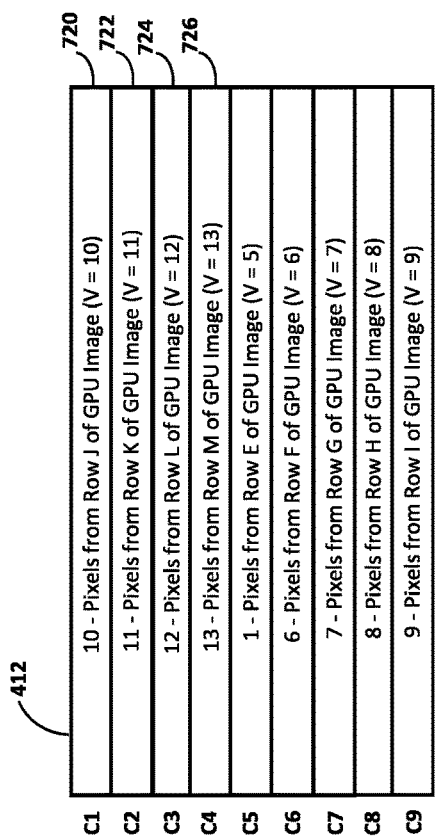
FIGS. 7A, 7B and 8 are schematic representations of an illustrative embodiment of an improved cache structure and methods as disclosed herein.
Figure 7A:
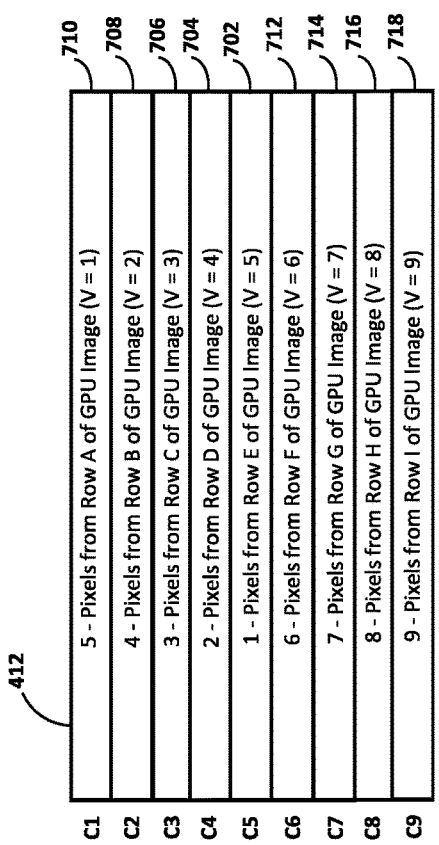

The systems and methods claimed herein rely on a predictive pre-fetch model and mechanism so that portions of the input image data 502 are pre-fetched from DRAM 404 before execution of the LSR adjustment begins. For example, FIG. 7A schematically and for purposes of illustration only illustrates a cache 412 having nine lines labelled C1 through C9. The actual size of cache 412 can be optimized in accordance with the principles discussed above. In one embodiment, each pre-fetch operation could be designed to retrieve from DRAM 404 32 rows of input data, consisting of four swaths of data consisting of eight rows per swath, and cache 412 could be sized to accommodate one or more pre-fetch operations.

Continuing with the example, FIG. 7A also schematically and for purposes of illustration only illustrates that initial pre-fetch of input image data 502 from DRAM 404 could consist of nine lines of input image data 502 (i.e., rows A through I), including the first five lines of data (i.e., rows A through E of input image 502) needed to construct the first line of output image 504 (i.e., row 1 of output image 504). The actual number of lines of input data retrieved during the initial pre-fetch operation and/or any subsequent pre-fetch cycle can be optimized based the speed of constructing output image 504 (i.e., the number of lines needed to stay ahead of the execution between pre-fetch cycles).

In addition, the commencement of initial execution of constructing output image 504 can be further advanced by writing the input image data 502 into the cache 412 in the order it will be needed to construct output image 504. Referring again to FIG. 7A, in the illustrated example, row E of the input image data will be written into the cache first as indicated at 702, then row D indicated at 704 and so on until all of the rows retrieved in a particular pre-fetch cycle have been written into cache 412. For the initial pre-fetch operation, the first row of input image data 502 needed to construct output image 504 (e.g., row E) can be placed at or near the "middle" row of the cache 412 (e.g., row C5). As further illustrated in FIG. 7A at 704 through 718, the other rows of input image data retrieved in the initial pre-fetch operation can be placed in cache 412 according to their relative v values, with rows having a lower v value being placed in order of descending v value above row E, and rows having a higher v value being placed in order of ascending v value below row E.

Figure 8:
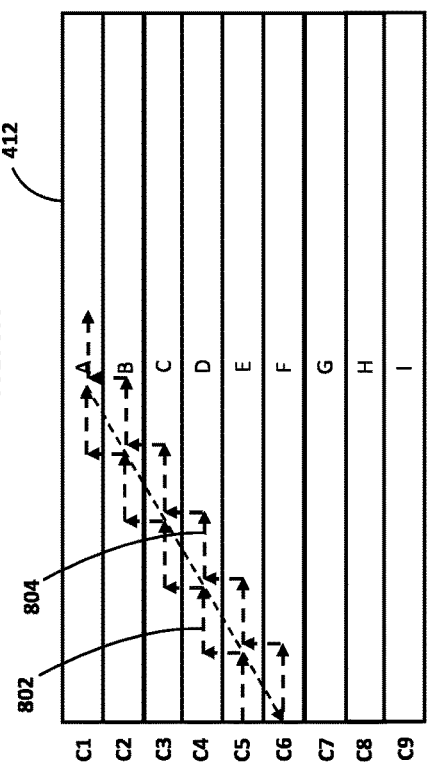

Once all of the rows of input image data 502 needed to construct the first line of display image 504 have been written into cache 412, execution of rendering output image 504 to an output buffer or to display 416 can commence. In addition, pre-fetching the input image data 502 and writing it into cache 412 in the manner described above can help to reorder and organize the input image data 502 in cache 412 in such a way as to produce a predictable and relatively simple walk of the image data in the cache to construct output image 504 in raster scan order, all as schematically illustrated in FIG. 8. For example, the series of dotted arrows 802 schematically illustrates the walk of input image data 504 in cache 412 in order to construct the first line of output image 504. Similarly, the series of dotted arrows 804 schematically illustrates the walk of input image data 504 in cache 412 in order to construct the second line of output image 504, and so forth.

As can be seen in FIG. 6, by the time the second line of output image 504 has been generated and processing has moved on to the third line of output image 504, row A of input image 502 will no longer be needed for output image 504 and can be evicted from cache 412. With cache 412 appropriately sized, eviction from cache 412 only happens after a particular row of input image data is no longer needed, but happens automatically as additional input image data is retrieved during subsequent pre-fetch operations and written into cache 412.

To handle this, the v value of the input image data can be used as an index in cache 412 so that rows present in cache 412 are overwritten in order of the row having the lowest v value being overwritten first. This is schematically illustrated in FIG. 7B. For purposes of illustration only, FIG. 7B assumes that an additional four rows of image data 502 have been retrieved from DRAM 404 in a subsequent pre-fetch operation and have been written into cache 412 in the order represented by reference numerals 720 through 726. In other words, row A (FIG. 7A) having the lowest v value in the cache at the time (see FIG. 7A) is overwritten first and is overwritten by row J of input image 502, since row J is the row of input image data retrieved from DRAM 404 in the subsequent pre-fetch operation that will be needed first (as compared to the additional rows retrieved during the subsequent pre-fetch cycle) to construct output image 504.

This cache indexing and replacement policy can be established on the premise that both the input image and the display image can be walked top to bottom, which helps to simplify the indexing and the replacement policy. In addition, the cache can be divided into columns and tiles, and the foregoing processes can be divided up and can be performed separately on individual tiles of data. For example, based on the u coordinates of the input image data, replacement can be performed within each column separately. Similarly, based on the u and v coordinates of the input image data, replacement can be performed separately on individual tiles of data.

The embodiments discussed above were described using the context of a system that includes a holographic processing unit (HPU). However, it should be understood and will be readily apparent to those skilled in the art that the principles discussed above can readily be extended other non-HPU implementations, including, but not limited to, a SOC implementation.

In addition, while the embodiments described above contemplate pre-fetching and processing image data on a row-by-row basis, it should be understood and will be readily apparent to those skilled in the art that the principles discussed above can readily be extended to providing for fetching and processing image data on less than a complete row at a time. For example, the same principles could be used to fetch and process image data based on a desired grouping of pixels or other grouping of image data of efficient granularity.

Thus, it can be seen that the improved cache structure and methods disclosed above are optimally sized to support a predetermined range of LSR adjustments and in which image data is intelligently read out of DRAM and cached in such a way as to eliminate re-fetching of input image data from DRAM and minimize DRAM bandwidth and power. The cache structure is optimally sized to support a predetermined range of LSR adjustments and is managed such that: the cache/buffer can fetch each line of input image data only once to reduce input bandwidth; the cache can hold multiple lines sufficient to construct the output image (but still much less than the full image); the cache can pre-fetch data before it is needed so that it does not add any additional latency to the image processing pipeline; and the cache can evict input image data only when it is no longer needed to construct the output image, but can automatically evict input image data when it is no longer needed. Input image data can initially be written into the cache in the order it will be needed to begin rendering the output image, and the input image data can be written into the cache and organized in a manner that makes predictable the order in which the output image data is read out of the cache.

Data Compression

The cache structure and methods described above can be adapted to work with compressed image data. In this case, the GPU generated image data is compressed before storing it in DRAM 404, which can provide an additional level of savings in terms of DRAM storage space, power consumption and bandwidth. The image data can be compressed before saving to DRAM 404. Compressed image data can generally be divided up into tiles, which can generally be characterized as the smallest block or quantity of data that can be compressed to achieve a desired compression ratio. In this case, the data generated by the GPU is compressed by a selected compression algorithm at a selected compression ratio and saved in DRAM 404 as compressed image data.

Figure 9:
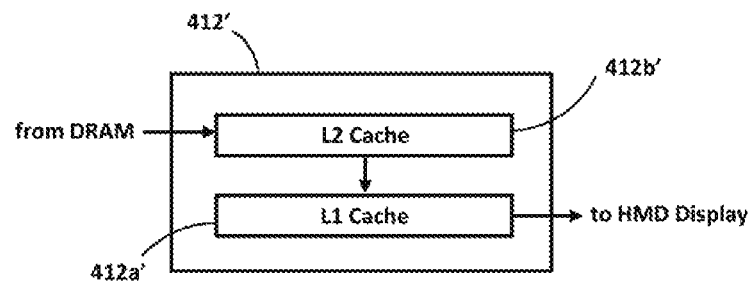
FIGS. 9 and 10 are functional block diagrams illustrating additional embodiments of an improved cache further adapted to work with compressed image data.

As in the embodiments described previously, HPU 406 can retrieve or pre-fetch the compressed GPU or input image data from DRAM 404 in the order needed to construct the output image according to the LSR adjustment matrix. However, in this case, the GPU image data will be pre-fetched from DRAM 404 as one or more tiles (as opposed to multiple lines or rows as discussed previously). In addition, in order to handle compressed image data coming from DRAM 404, cache 412' can consist of two more levels of physically separate cache. In one embodiment, which is illustrated in FIG. 9, the tile(s) of compressed data pre-fetched from DRAM 404 can be decompressed during the pre-fetch and saved into a first cache (such as, for example, L2 cache 412b' in FIG. 9) in decompressed form. As with the other embodiments disclosed above, the input image data is pre-fetched from DRAM 404 in the order in which it is needed to construct the output or display image as directed by the LSR adjustment matrix, only this time the input image data is retrieved from DRAM 404 in tiles of data instead of individual lines or rows. And, as with the previous embodiments, the cache structure and methods can be configured so that a given tile of data is pre-fetched or retrieved from DRAM 404 only once and is retained in cache 412' until it is no longer needed to construct the output or display image.

Once the decompressed image data is in the L2 cache 412b', the data can be transferred from L2 cache 412b' to a second, physically separate and smaller cache (such as L1 cache 412a' in FIG. 9). Transfers of data from L2 cache 412b' to L1 cache 412a' are performed by a second level of pre-fetch operations and in the order in which the data is needed to construct the output or display image. Furthermore, the pre-fetch operations from L2 cache 412b' to L1 cache 412a', the ordering and placement of the uncompressed image data in L1 cache 412a', and eviction of such uncompressed data from L1 cache 412a' generally conforms to the methods and principles described above in relation to cache 412 of FIGS. 7 and 8. And, as explained previously, the timing of the various pre-fetch operations (both from DRAM 404 to L2 cache 412b', and from L2 cache 412b' to L1 cache 412a') is selected so that the input image data is pre-fetched and is located in the proper L2 or L1 cache when and as needed to stay ahead of execution and output of the display image.

Figure 10:
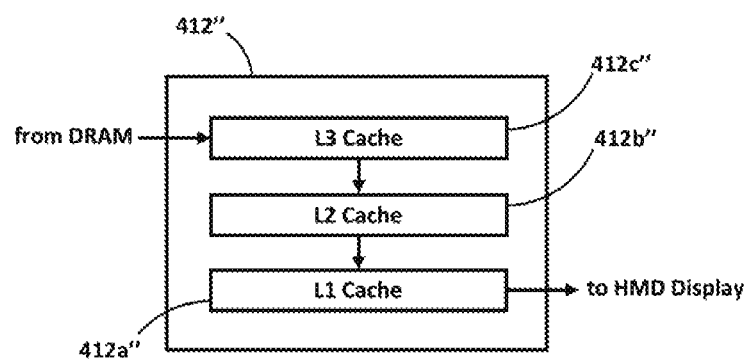

In another embodiment, illustrated in FIG. 10, the tile(s) of compressed data pre-fetched from DRAM 404 can simply be retrieved in the pre-fetch, without decompression, and saved in compressed form in a first cache, such as L3 cache 412c". As above, the tiles of compressed input image data is pre-fetched from DRAM 404 in the order in which it is needed to construct the output or display image as directed by the LSR adjustment matrix, and the cache structure and methods can be configured so that a given tile of data is pre-fetched or retrieved from DRAM 404 only once and is retained in cache 412" until it is no longer needed to construct the output or display image. In this embodiment, a second, smaller cache, such as L2 cache 412b", is used to perform a second level of pre-fetch operations to periodically retrieve one or more tiles of compressed data from L3 cache 412c" in the order needed to construct the display image as directed by the LSR adjustment matrix. The compressed data is decompressed during the pre-fetch operation and is saved as decompressed data in L2 cache 412b". And finally, in yet another level of pre-fetch operations, a smaller quantity of image data can be pre-fetched from L2 cache 412b" in the order needed to construct the display image as directed by the LSR adjustment matrix and placed in a third, even smaller cache, such as L1 cache 412a". In terms of relative size, in one embodiment, L3 cache 412c" could be on the order of approximately 480 kilobytes, L2 cache 412b" could be on the order of approximately 72 kilobytes, and L1 cache 412c" could be on the order of approximately 2 kilobytes.

As with the embodiments described previously in relation to FIGS. 7 and 8, any given portion of the GPU image data stored in DRAM 404 (regardless of whether that given portion consists of a row, a swath of rows, a tile, or multiple tiles) will be retrieved or fetched from DRAM 404 once and only once during the entire process of constructing the adjusted output or display image. In the embodiments of FIGS. 9 and 10, however, decompressed image data can be fetched (or re-fetched) from L2 cache 412b', 412b" and read into L1 cache 412a', 412a" multiple times, as needed, to construct the output or display image.

Multiple LSR Processing Engines and Decompression

Figure 11:
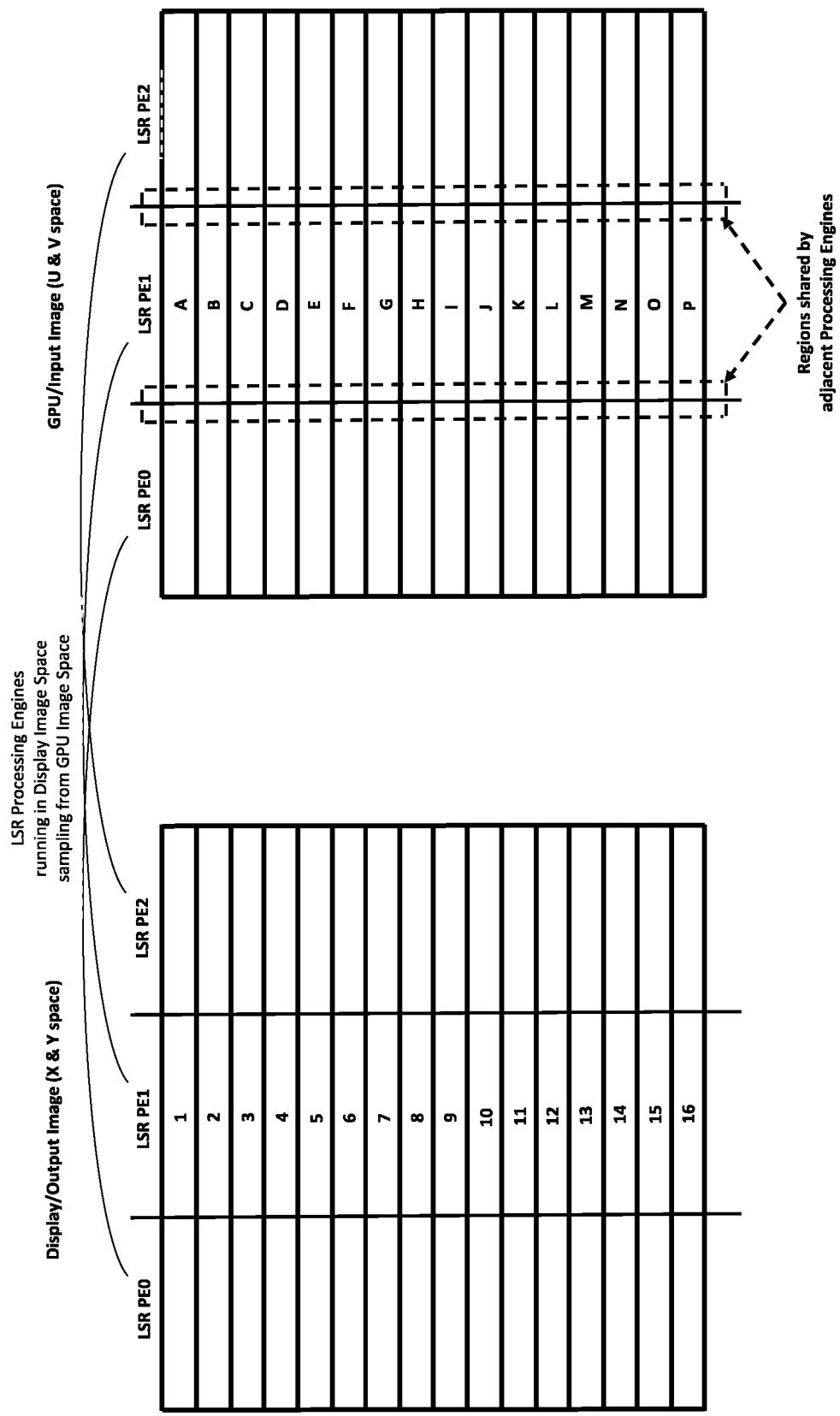
FIGS. 11 and 12 are schematic representations illustrating how processing of image data can be divided between multiple late stage reprojection (LSR) processing engines.

In some cases, multiple LSR processing engines may be required to process a frame in order to reduce the LSR latency and to meet performance constraints. For example, these processing engines may operate on different colors or on different portions of an image at the same time. Depending on the compression algorithm, multiple processing engines may need to access the same compressed frame data, which could lead to some of the same data being decompressed multiple times, resulting in added latency and/or power consumption. For example, as schematically illustrated in FIG. 11, when using multiple LSR processing engines, the GPU image can be partitioned with a separate LSR processing engine dedicated to each partition, such as LSR PE0, LSR PE1 and LSR PE2 for example. However, there is inherently a region of overlap between adjacent partitions, as schematically depicted in the right half of FIG. 11. Due to compression, there is an added power penalty when decompressing frame data, especially if the frame data needs to be decompressed multiple times due to reduced cache/buffer sizes or multiple processing engines accessing the same data.

Figure 12:
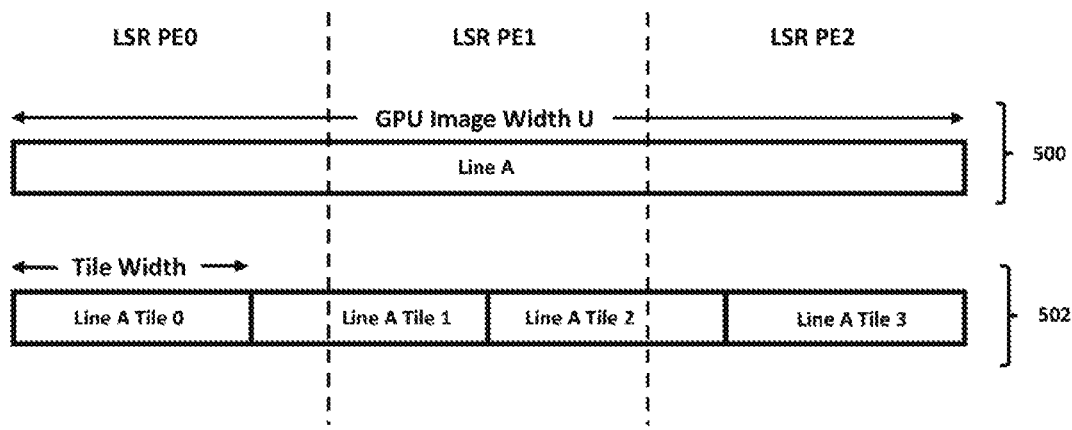
Figure 14:
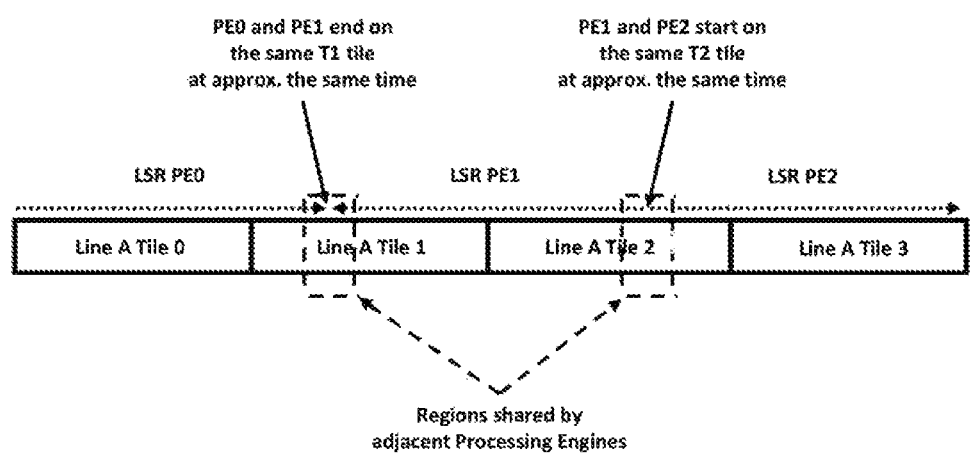
FIG. 14 is another schematic representation illustrating an additional aspect of processing image data by multiple LSR processing engines.

To address these issues, another embodiment can provide a cache structure as illustrated in FIG. 12 that helps reduce, in not eliminate, the need to decompress the same data multiple times (and, thus, further reduce latency and power consumption). As discussed above, the GPU generated image data is compressed before storing it in DRAM 404, which can provide an additional level of savings in terms of DRAM storage space, power consumption and bandwidth. The image data can be compressed before saving to DRAM 404. Compressed image data can generally be divided up into tiles, which can generally be characterized as the smallest block or quantity of data that can be compressed to achieve a desired compression ratio. For example, referring to FIG. 12, if a full line of GPU image data has a width U as schematically illustrated at 500, the image data can be divided into one or more tiles, such as tiles 0 to 3 as schematically shown at 502, each having a certain tile width. In this example, the image is divided into four tiles, but the number and width of the tiles can vary depending on the particular circumstances. And, as graphically illustrated in FIG. 12, the width of the tiles may not coincide with the partitions associated with LSR processing engines LSR PE0, LSR PE1 and LSR PE2 (as indicated in FIG. 12 by the dashed lines). Thus, it can be readily seen that some tiles of image data may need to be accessed by more than one LSR processing engine. For example, in the example illustrated in FIG. 12, both LSR PE0 and LSR PE1 will need to access tile 1 and, likewise, both LSR PE1 and LSR PE2 S will need to access tile 2.

As in the embodiments described previously, HPU 406 can retrieve or pre-fetch one or more tiles of the compressed GPU or input image data from DRAM 404 in the order needed to construct the output image according to the LSR adjustment matrices associated with the multiple LSR processing engines. In the embodiment illustrated in FIG. 13, the tile(s) of compressed data pre-fetched from DRAM 404 can simply be retrieved in the pre-fetch, without decompression, and saved in compressed form in a first cache, such as L3 cache 512c. As with the previous embodiments, the tiles of compressed input image data are pre-fetched from DRAM 404 in the order in which they are needed to construct the output or display image as directed by the LSR adjustment matrices associated with each of the multiple LSR processing engines, and the cache structure and methods can be configured so that a given tile of data is pre-fetched or retrieved from DRAM 404 only once and is retained in cache 512c until it is no longer needed to construct the output or display image.

A second, smaller cache, such as L2.5 cache 512d, is used to perform a second level of pre-fetch operations to periodically retrieve one or more tiles of compressed data from L3 cache 512c in the order needed to construct the display image as directed by the LSR adjustment matrices. The compressed data is decompressed during the pre-fetch operation and is saved as decompressed data in L2.5 cache 512d.

Figure 13:
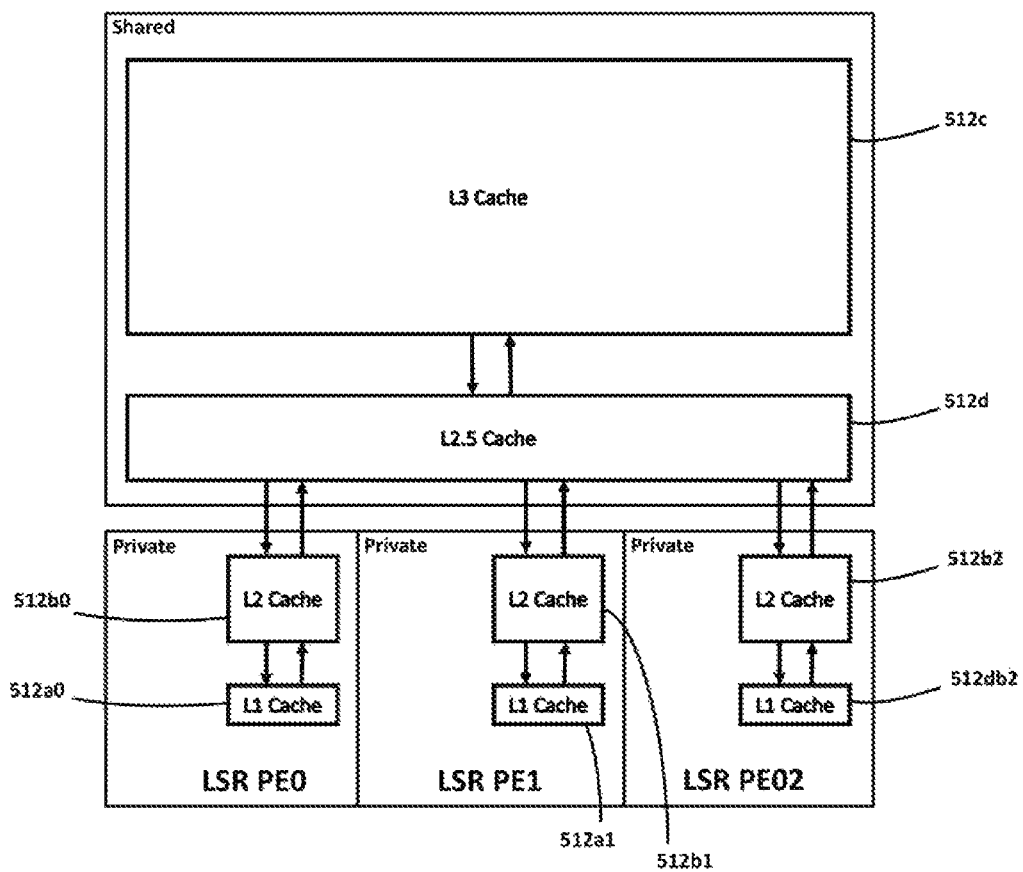
FIG. 13 is a functional block diagram illustrating an additional embodiment of an improved cache further adapted to work with compressed image data and multiple LSR processing engines.

As further shown in FIG. 13, the L3 cache 512c and the L2.5 cache 512d are shared caches, accessible to all of the LSR processing engines. In addition, separate private cache structures can be provided for each LSR processing engine as illustrated. For example, L2 cache 512b0 and L1 cache 512a0 can be provided and dedicated for LSR processing engine LSR PE0, L2 cache 512b1 and L1 cache 512a1 can be provided and dedicated for LSR processing engine LSR PE1, L2 cache 512b2 and L1 cache 512a2 can be provided and dedicated for LSR processing engine LSR PE2, and so forth. The L2 and L1 caches of this embodiment function in essentially the same manner as described in relation to the L2 and L1 caches of the embodiment shown in FIG. 10, except that each operates within the partition of data associated with its corresponding LSR processing engine.

As tiles are stored in the L2.5 cache 512d, a replacement algorithm can be provided for optimal re-use of decompressed frame data. Various replacement algorithms can be devised, some of which could be fairly complex, since the amount of time a given tile should be retained within the L2.5 cache 512d can depend on whether multiple processing engines will need to access that particular tile. However, a simple round-robin replacement algorithm can be used if the processing engines access the same tiles (spatial) at about the same time (temporal). This can be achieved by reversing the frame processing of every other processing engine, which is graphically illustrated in FIG. 13. As shown, LSR PE0 and LSR PE2 can process the image from left to right (as represented by the dotted arrows) while LSR PE1 can process the image from right to left (as also represented by the dotted arrow), with all LSR processing engines maintaining the same direction in the vertical dimension. With every other LSR processing engine working in the reverse order, adjacent processing engines will either start or end processing of the same tile at or about the same time, which allows individual tiles to be accessed and discarded more quickly.

The various embodiments described above provide the following advantages over the prior art. They provide multiple level compression caches for LSR image data to reduce storage requirements and latency. They "hide" compression latency. They are compression algorithm independent. They enable image processing partitioning to maximize spatial/ temporal locality when accessing image caches. And, they minimize the number of times frame data is decompressed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted, augmented, mixed or virtual reality display device (HMD) comprising:
    a display;
    a graphics processing unit (GPU) for processing input image data and for providing output image data to the display;
    system memory that stores image data;
    a holographic processing unit (HPU), with an on-chip cache, the HPU to compensate for movement of the HMD that occurs between the time the input image data is received by the GPU and an output image is displayed on the display, the HPU
    pre-fetching one or more tiles of input image data from system memory and placing the pre-fetched input image data in a first cache, the one or more tiles of input image data being selected in the order needed to construct the output image based on a relationship between the input image data and transformed output image data based on said movement of the HMD;
    pre-fetching input image data from the one or more tiles in the first cache and writing the pre-fetched input image data into a second cache, the input image data being selected in the order needed to construct the output image based on a relationship between the input image data and the transformed output image data based on said movement of the HMD; and
    constructing a first portion of the output image by walking the input image data in the second cache in the order needed to construct the output image based on a relationship between the input image data and the transformed output image data based on said movement of the HMD.

2. The HMD device of claim 1 further comprising:
    pre-fetching input image data from the one or more tiles in the first cache and writing the pre-fetched input image data into a third cache, the input image data being selected in the order needed to construct a second portion of the output image based on a relationship between the input image data and the transformed output image data based on said movement of the HMD; and
    constructing a second portion of the output image by walking the input image data in the third cache in the order needed to construct the second portion of the output image based on a relationship between the input image data and the transformed output image data based on said movement of the HMD.

3. The HMD device of claim 2 further comprising an act for rendering the output image on the display.

4. The HMD device of claim 3, wherein the first portion of the output image is constructed by a first late stage reprojection (LSR) processing engine and the input image data in the second cache is accessible to the first LSR processing engine.

5. The HMD device of claim 4, the second portion of the output image is constructed by a second LSR processing engine and the input image data in the third cache is accessible to the second LSR processing engine.

6. The HMD device of claim 5, wherein, in the act for pre-fetching one or more tiles of input image data from system memory, including all of the tiles of input image data in the first cache that are needed by the first LSR processing engine to construct the first portion of the output image and that are needed by the second LSD processing engine to construct the second portion of the output image.

7. The HMD device of claim 6, wherein, in the act for pre-fetching input image data from the one or more tiles in the first cache and writing the input image data into the second cache, including all of the input image data in the second cache that is needed by the first LSR processing engine to construct the first portion of the output image.

8. The HMD device of claim 7, wherein, in the act for pre-fetching input image data from one or more tiles in the first cache and writing the input image data into the third cache, including all of the input image data in the third cache that is needed to by the second LSR processing engine to construct the second portion of the output image.

9. The HMD device of claim 8 further comprising:
    performing additional pre-fetch operations to retrieve one or more additional tiles of input image data from system memory, the one or more additional tiles of input image data in the system memory being selected in the order needed to construct an other portion the output image based on a relationship between the input image data and the transformed output image data based on said movement of the HMD.

10. The HMD device of claim 9 further comprising:
    performing additional pre-fetch operations to retrieve additional input image data from the first cache and writing the additional input image data into the second cache, the additional input image data in the first cache being selected in the order needed to construct the other portion of the output image based on a relationship between the input image data and the transformed output image data based on said movement of the HMD.

11. The HMD device of claim 10 further comprising:
performing additional pre-fetch operations to retrieve additional input image data from the first cache and writing the additional input image data into the third cache, the additional input image data in the first cache being selected in the order needed to construct the other portion of the output image based on a relationship between the input image data and the transformed output image data based on said movement of the HMD.

12. The HMD device of claim 11 further comprising an act for automatically evicting input image data from the second cache when it is no longer needed to construct the first portion of the output image.

13. The HMD device of claim 12, wherein the act for automatically evicting comprises overwriting input image data already in the second cache with additional input image data retrieved during a subsequent pre-fetch operation from the first cache.

14. The HMD device of claim 13 further comprising an act for automatically evicting input image data from the third cache when it is no longer needed to construct the second portion of the output image.

15. The HMD device of claim 14, wherein the act for automatically evicting comprises overwriting input image data already in the third cache with additional input image data retrieved during a subsequent pre-fetch operation from the first cache.

16. The HMD device of claim 15, wherein the input image data is overwritten with a predetermined grouping of pixels or other efficient width granularity.

17. The HMD device of claim 5, wherein one of the first and second LSR processing engines processes input image data from left to right and the other one of the first and second LSR processing engines processes input image data from right to left.

18. The HMD device of claim 1, wherein the sizes of the first cache and the second cache are selected to support a predetermined range of late stage reprojections.

19. The HMD device of claim 18, wherein the size and power consumption properties of the first cache and the second cache are kept as small as possible and yet are sized large enough that each line of input image data is fetched only once during the process of constructing the output image so as to reduce input bandwidth requirements.

* * * * *